US012602090B2

(12) United States Patent
Lim et al.

(10) Patent No.: US 12,602,090 B2
(45) Date of Patent: Apr. 14, 2026

(54) SUPPORT PLATE FOR FOLDING PORTABLE DISPLAY DEVICE

(71) Applicant: Google LLC, Mountain View, CA (US)

(72) Inventors: Yongho Lim, Chicago, IL (US); Peiwen Hung, Taipei (TW); Tingwei Hsu, Taoyuan (TW)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 18/600,503

(22) Filed: Mar. 8, 2024

(65) Prior Publication Data

US 2025/0284321 A1      Sep. 11, 2025

(51) Int. Cl.
*G06F 1/16* (2006.01)

(52) U.S. Cl.
CPC .......... *G06F 1/1681* (2013.01); *G06F 1/1637* (2013.01)

(58) Field of Classification Search
CPC ............................ G06F 1/1681; G06F 1/1637
See application file for complete search history.

(56) References Cited

U.S. PATENT DOCUMENTS

| | | | | | |
|---|---|---|---|---|---|
| 10,761,574 | B1 * | 9/2020 | Hsu | ........................ | G06F 1/1616 |
| 11,108,901 | B2 * | 8/2021 | Lin | ........................ | H04M 1/0216 |
| 11,516,932 | B2 * | 11/2022 | Sim | ........................ | E05D 3/122 |
| 11,528,352 | B1 * | 12/2022 | Lim | ........................ | H04M 1/0237 |
| 11,550,367 | B2 * | 1/2023 | Lin | ........................ | G06F 1/1681 |
| 11,812,568 | B2 * | 11/2023 | Xie | ........................ | H05K 5/0226 |
| 11,815,963 | B2 * | 11/2023 | Baek | ........................ | G06F 1/1656 |
| 11,846,997 | B2 * | 12/2023 | Liao | ........................ | H04M 1/0216 |
| 11,907,027 | B2 * | 2/2024 | Torres | ........................ | G06F 1/1616 |

| | | | | | |
|---|---|---|---|---|---|
| 11,977,421 | B2 * | 5/2024 | Yang | ........................ | E05D 11/082 |
| 11,983,047 | B2 * | 5/2024 | Park | ........................ | G06F 1/1624 |
| 12,031,570 | B2 * | 7/2024 | Hsu | ........................ | G06F 1/1681 |
| 12,079,047 | B2 * | 9/2024 | Hsu | ........................ | F16C 11/04 |
| 12,108,550 | B2 * | 10/2024 | Oh | ........................ | H04M 1/022 |
| 2019/0212786 | A1 * | 7/2019 | Lin | ........................ | H04M 1/0216 |
| 2020/0267859 | A1 * | 8/2020 | Kim | ........................ | G06F 1/1641 |
| 2022/0342458 | A1 * | 10/2022 | Ai | ........................ | G06F 1/1641 |
| 2023/0069146 | A1 * | 3/2023 | Kim | ........................ | G06F 1/1652 |

(Continued)

FOREIGN PATENT DOCUMENTS

EP      4106500 A1      12/2022

OTHER PUBLICATIONS

Sengupta, "Microsoft working on a true folding smartphone, may take on Samsung and Oppo", India today, retrieved from: https://www.indiatoday.in/technology/news/story/microsoft-likely-working-on-a-true-folding-smarphone-samsung-and-oppo-2320705-2023-01-12, Jan. 12, 2023, 4 pp.

*Primary Examiner* — Rockshana D Chowdhury
(74) *Attorney, Agent, or Firm* — Shumaker & Sieffert, P.A.

(57) ABSTRACT

An example folding device comprising: a first housing; a second housing; a hinge assembly rotatably connected to the first housing and the second housing; a continuous display connected to and across the first housing and the second housing; and a first collapsible support plate connected to the first housing and configured to support the continuous display when the folding device is fully opened, wherein: the first collapsible support plate comprises a single continuous plate folded over itself to form two parallel plates, a first parallel plate of the two parallel plates defines a straight edge that overhangs one or more voids in a second parallel plate of the two parallel plates, and the straight edge defined by the first parallel plate is adjacent to the hinge assembly.

9 Claims, 7 Drawing Sheets

(56) References Cited

U.S. PATENT DOCUMENTS

| | | | |
|---|---|---|---|
| 2023/0216199 A1 | 7/2023 | Oh et al. | |
| 2023/0229203 A1* | 7/2023 | Hsiang | G06F 1/1624 |
| | | | 361/679.27 |
| 2023/0229204 A1* | 7/2023 | Shim | G06F 1/1681 |
| | | | 361/679.28 |
| 2023/0409077 A1* | 12/2023 | Kim | H04M 1/0268 |
| 2025/0023966 A1* | 1/2025 | Park | G06F 1/1616 |
| 2025/0031329 A1* | 1/2025 | Woo | G06F 1/1681 |

* cited by examiner

SUPPORT PLATE FOR FOLDING PORTABLE DISPLAY DEVICE

BACKGROUND

Devices that include displays may be referred to as display devices. In general, it may be desirable to increase a size of a display (e.g., the area on which images are displayed) as much as possible. Increasing the size of a display may make the device that includes the display large and unwieldy. For instance, devices with larger displays may not fit in pockets, bags, and the like. One way to increase the size of a display without negatively affecting the portability of the device is to make the device collapsible such that the display can be folded (e.g., in half).

SUMMARY

In general, aspects of this disclosure are directed to supporting plates (i.e., support plates) of a folding device. Folding devices may generally include two housings connected via a hinge assembly and a continuous display that spans the two housings. Folding devices may include a support plate, comprising two separate plates, that support a rear of the continuous display when the folding device is fully opened. Such designs may assist in preventing or limiting deformation in the continuous display and/or provide consistent support of the continuous display when the folding device is open (e.g., as a user drags their finger across the span of the continuous display between the two housings). However, such designs may not be desirable. For instance, the use of two separate plates to form the support plate may occupy additional space within the folding device, increase the weight of the folding device, and/or increase a manufacturing cost of the folding device.

In accordance with one or more aspects of this disclosure, a folding device may include a single continuous plate folded over itself to form two parallel plates that operate as a support plate for the folding device. For instance, the single continuous plate may include a fold to form a first plate, parallel to, a second plate. The second plate may comprise assembly geometry and weight reduction geometry, while the first plate may comprise a clean surface (i.e., limited assembly geometry and no weight reduction geometry). The first plate may include a straight edge, opposite the fold, that overhangs a non-straight and complex outline of the second support plate, without inhibiting movement of hinge assembly components. As such, when the folding device is open, deformations in the continuous display are mitigated (e.g., any distortions or changes in the continuous display caused by the non-straight and complex outline of the second plate may be prevented or limited). In this way, aspects of this disclosure may reduce manufacturing costs, weight, and/or occupation of space within the folding device, while preventing or limiting deformation in the continuous display and/or providing consistent support of the continuous display when the folding device is open.

In one example, a folding device includes a first housing; a second housing; a hinge assembly rotatably connected to the first housing and the second housing; a continuous display connected to and across the first housing and the second housing; and a first collapsible support plate connected to the first housing and configured to support the continuous display when the folding device is fully opened, wherein: the first collapsible support plate comprises a single continuous plate folded over itself to form two parallel plates, a first parallel plate of the two parallel plates defines a straight edge that overhangs one or more voids in a second parallel plate of the two parallel plates, and the straight edge defined by the first parallel plate is adjacent to the hinge assembly.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure is directed to folding devices that include foldable continuous displays with a span supported by support plates (i.e., supporting plates). A folding device may include at least two housings (i.e., panels) and a hinge assembly configured to allow the housings to be moved into a collapsed state in which the device is considered closed and an expanded state in which the device is considered open. When the device is in the expanded state, a display may be visible and may cover at least a portion of an inner surface of the housings. As such, the device may be considered to be a continuous display (i.e., because it continues across or spans a boundary between the housings). By utilizing a single continuous plate to create the support plate, as opposed to two separate plates, the continuous display may be supported while reducing the weight, manufacturing costs, and/or occupation of space within the folding device. In this way, foldable continuous display devices may be improved.

Figure 1A:
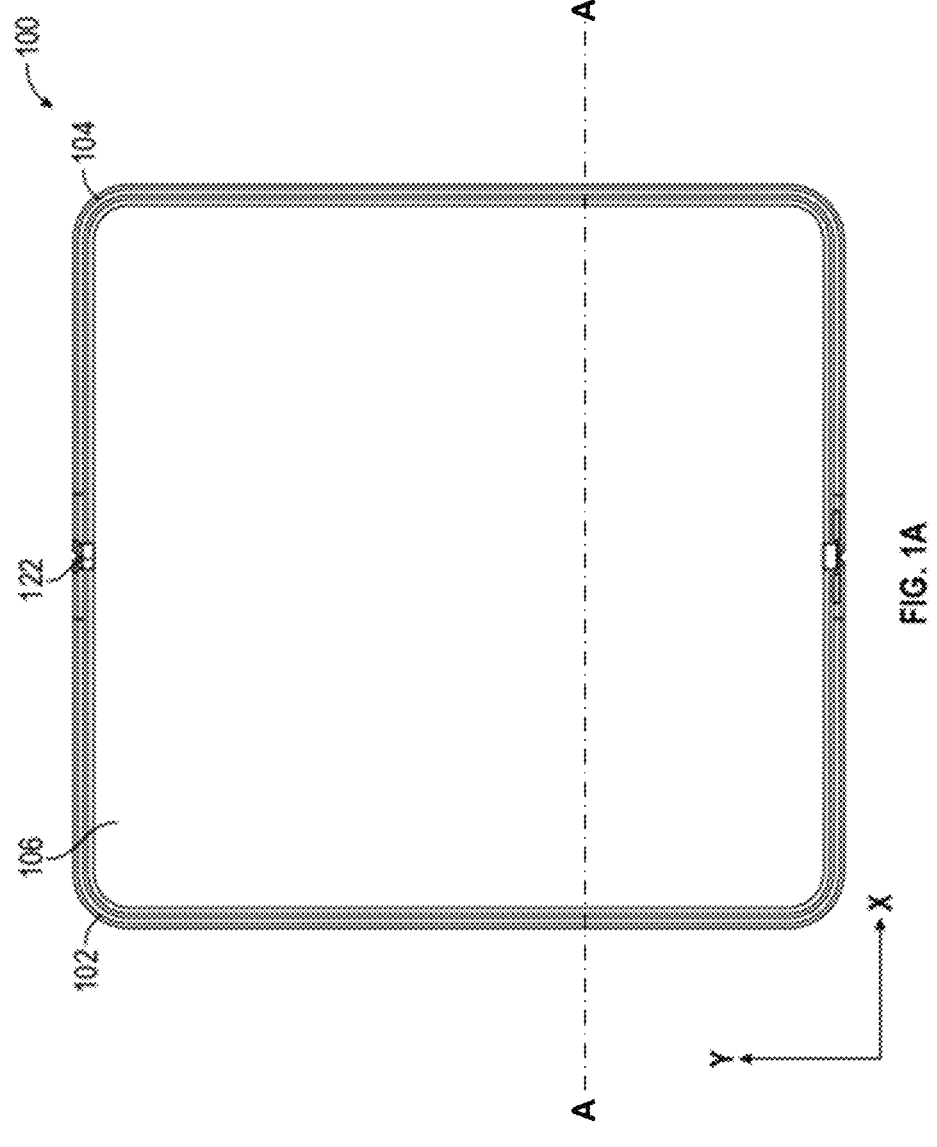
FIGS. 1A and 1B are schematic diagrams illustrating a folding device with a flexible continuous display, in accordance with one or more aspects of this disclosure.
Figure 1B:
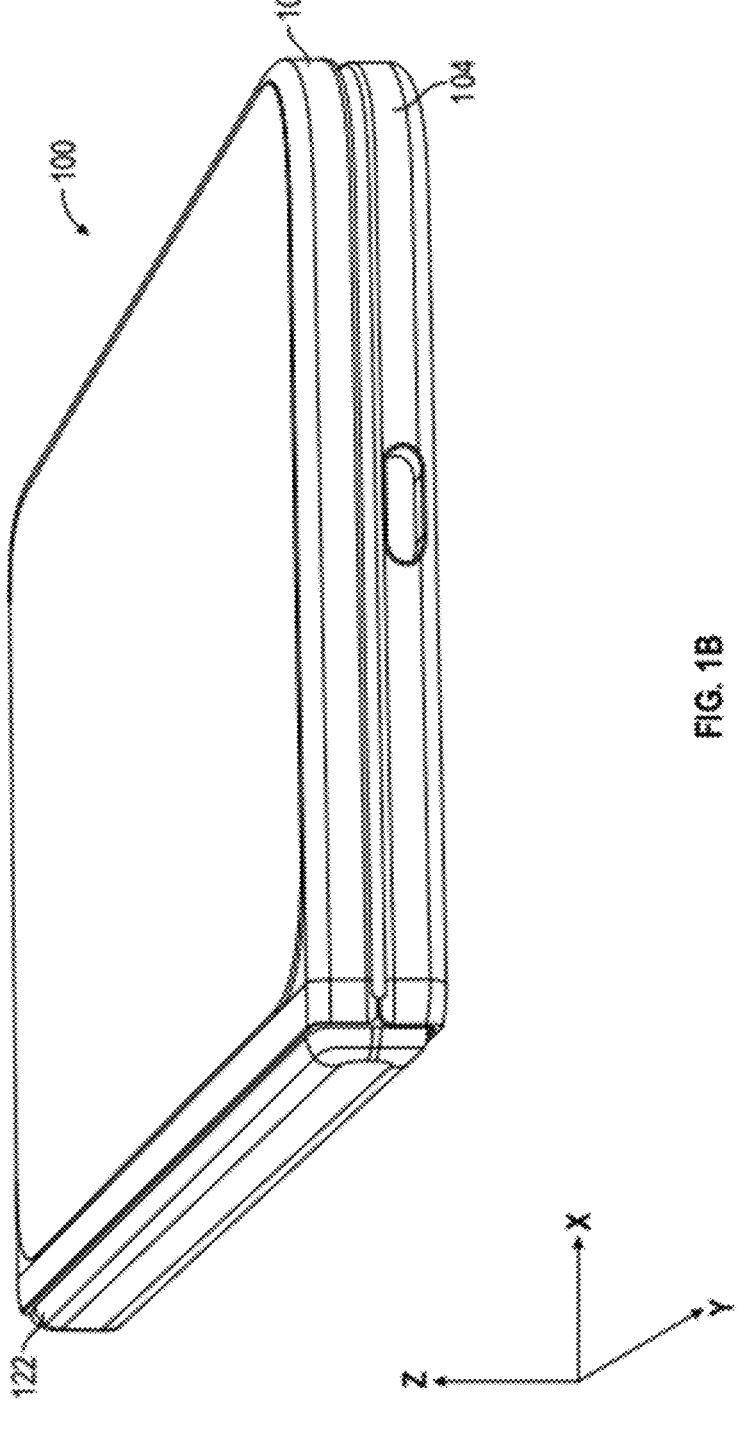

FIGS. 1A and 1B are schematic diagrams illustrating a folding device 100 with a flexible continuous display 106, in accordance with one or more aspects of this disclosure. Examples of device 100 include foldable mobile computing devices such as foldable smart phones, foldable tablets, foldable e-readers, foldable gaming systems, or any other foldable portable device that includes a display.

As shown in FIGS. 1A and 1B, device 100 includes a first housing 102, second housing 104, continuous display 106, and hinge assembly 122. Each of first housing 102 and second housing 104 may include an inner surface and an outer surface. When device 100 is closed the outer surface of first housing 102 may be visible when looking down at device 100 in the z-axis and the outer surface of second housing 104 may be visible when looking up at device 100 in the z-axis. The inner surfaces of first housing 102 and second housing 104 may not be externally visible when device 100 is closed. As further shown in FIG. 1A, when folding device 100 is fully open, an inner surface of a first housing 102 is coplanar with an inner surface of a second housing 104.

Computing and/or electrical components of device 100 may be distributed amongst first housing 102 and second housing 104. For example, first housing 102 may include a main logic board and second housing 104 may include a battery. This is merely one example arrangement of components amongst first housing 102 and/or second housing 104; other arrangements are possible. For instance, both first housing 102 and second housing 104 may include respective batteries.

Continuous display 106 may be capable of rendering data into images viewable by a user of device 100. For example, continuous display 106 may include a matrix of pixels that are individually controllable. Examples of continuous display 106 include, but are not limited to, liquid crystal displays (LCD), light emitting diode (LED) displays, organic light-emitting diode (OLED) displays, micro light-emitting diode (microLED) displays, or similar monochrome or color displays capable of outputting visible information to a user of device 100. Continuous display 106 may span hinge assembly 122 from first housing 102 to second housing 104.

In some examples, device 100 may include one or more displays in addition to continuous display 106. For instance, device 100 may include a first additional display on the outer surface of first housing 102. In some examples, device 100 may further include a second additional display on the outer surface of second housing 104.

One or more of continuous display 106, the first additional display, and/or the second additional display may be presence-sensitive displays. In some examples, a presence sensitive display may detect an object at and/or near a screen. As one example range, a presence-sensitive display may detect an object, such as a finger or stylus that is within 2 inches of the screen. The presence-sensitive display may determine a location (e.g., an (x,y) coordinate) of a screen at which the object was detected. In another example range, a presence-sensitive display may detect an object within six inches of the screen. Other ranges are also possible. The presence-sensitive display may determine the location of the screen selected by a user's finger using capacitive, inductive, and/or optical recognition techniques. In some examples, the presence sensitive display also provides output to a user using tactile, audio, or video stimuli.

In general, hinge assembly 122 may include supporting plates for support of a backside of the continuous display, such as continuous display 106. The resulting support on continuous display 106 may assist in preventing or limiting deformation in continuous display 106 and/or provide a consistent support of continuous display 106 as a user drags their finger across the span of continuous display 106 between the first and second housing. In some examples, two separate plates may be used to form the supporting plates. Such a design may be undesirable. For instance, the use of two separate plates to create a support plate may result in additional space being occupied within the folding device 100, an increase in the weight of the folding device 100, and/or an increase in a manufacturing cost of the folding device 100.

In accordance with one or more aspects of this disclosure, a single continuous plate folded over itself to form two parallel plates may be utilized as a support plate for the folding device 100. For instance, the single continuous plate may include a fold (i.e., a bend, a crease, etc.) to transform the single continuous place into a first plate, parallel to and still connected to, a second plate. The second plate may comprise assembly geometry and weight reduction features, while the first plate may comprise a clean surface (i.e., limited assembly geometry and no weight reduction features). The first plate may include a straight edge, opposite the fold, that overhangs a non-straight and complex outline of the second support plate, without inhibiting movement of hinge assembly components. As such, when the folding device 100 is open deformations in the continuous display are mitigated (i.e., any distortions or changes in the continuous display caused by the non-straight and complex outline of the second plate may be prevented or limited). In this way, aspects of this disclosure may reduce manufacturing costs, weight, and/or occupation of space within the folding device, while preventing or limiting deformation in the continuous display and/or providing consistent support of the continuous display when the folding device is open.

Figure 1C:
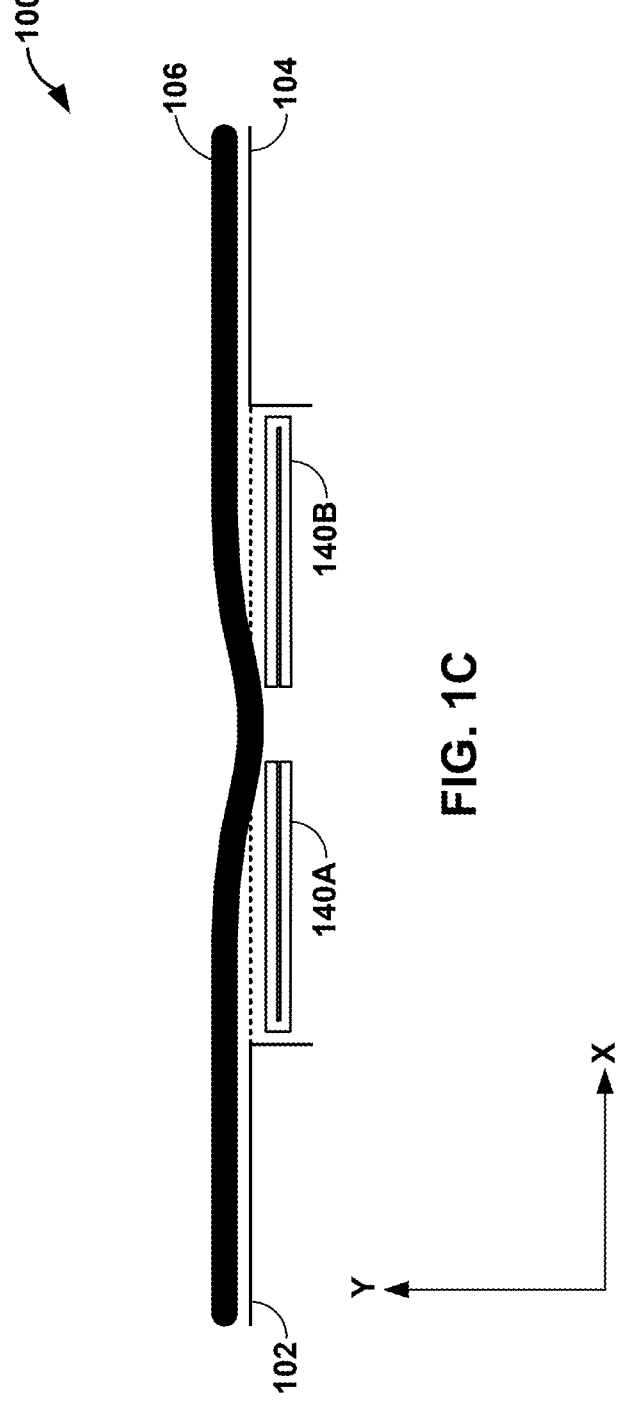
FIG. 1C is a conceptual diagram illustrating a cross-sectional view of a folding device with a flexible continuous display and example supporting plates, in accordance with one or more aspects of the disclosure.

FIG. 1C is a conceptual diagram illustrating a cross-sectional view of a folding device 100 with a flexible continuous display 106 and example supporting plates 140A and 140B (collectively, "support plates 140"). Support plates 140 push up along the y-axis. FIG. 1C may be a cross-sectional view of folding device 100 of FIG. 1A along line A-A.

As previously noted, support plates 140 may be configured to support a backside of a continuous display, such as continuous display 106. In some examples, support plates 140 may be collapsible support plates in that support plates 140 may fold away or otherwise be stowed when folding device 100 is closed. In some examples, actuation of support plates 140 may be performed by one or more components of the hinge assembly 122.

In some examples, support plates 140 may be parallel with a plane of continuous display 106 when folding device 100 is open. For instance, as shown in the example of FIG. 1C, the upper surfaces of support plates 140 are parallel with a plane of continuous display 106 (illustrated as a dashed horizontal line). In some examples, the support plates 140 may accommodate deformations in continuous display 106 (e.g., the indent at the center). In other examples, supporting plates 140 may not be parallel with a plane of continuous display 106, but may still accommodate deformations in continuous display 106. In some examples, a gap may be present between supporting plates 140 to further help accommodate the deformations in continuous display 106.

Figures 2A, 2B:
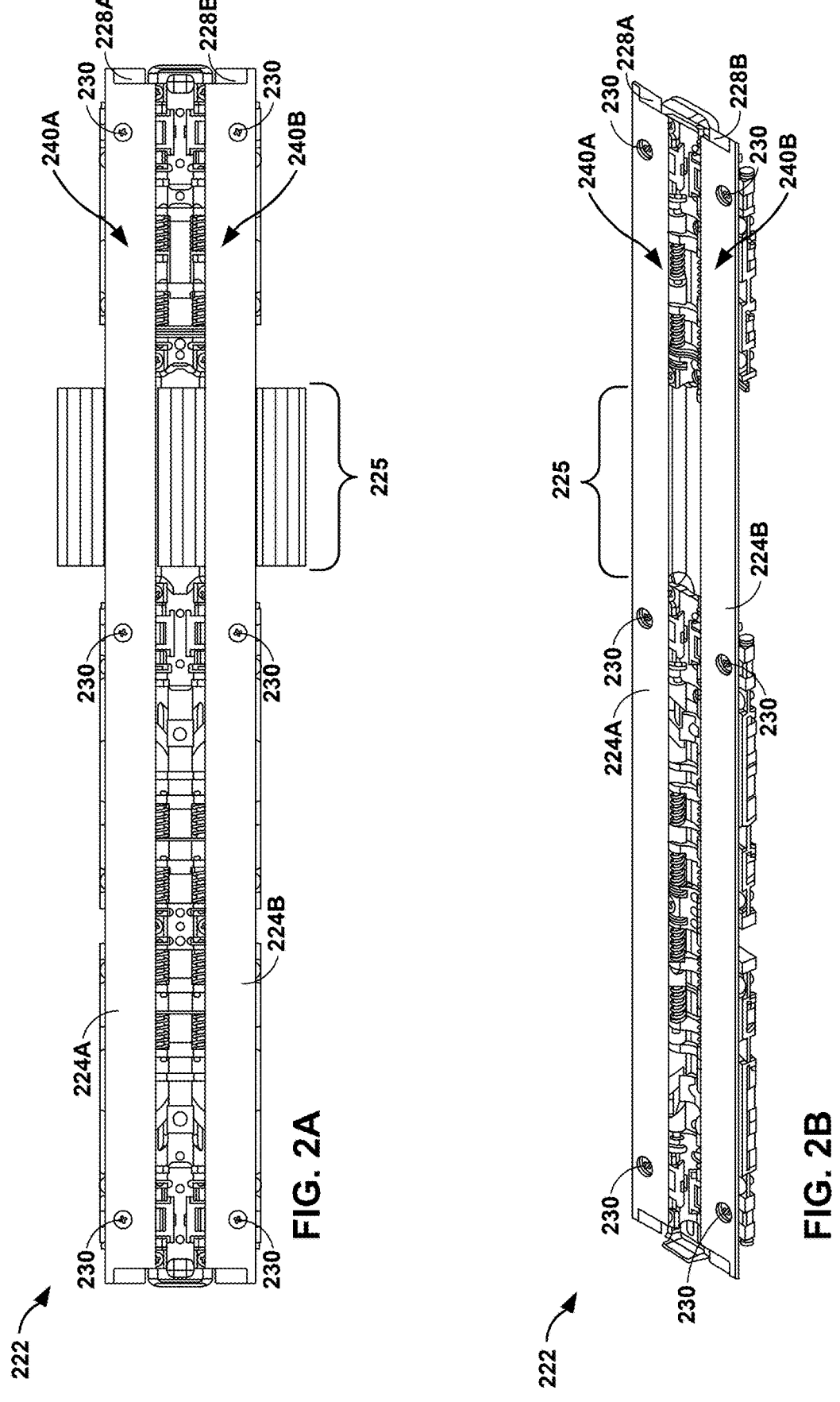
FIGS. 2A and 2B are conceptual diagrams illustrating example hinge assemblies with supporting plates, in accordance with one or more aspects of this disclosure.

FIGS. 2A and 2B are conceptual diagrams illustrating example hinge assemblies 222 with supporting plates 240A and 240B (collectively, "support plates 240"), in accordance with one or more aspects of this disclosure. Hinge assemblies 222 of FIGS. 2A and 2B may be an example of hinge assembly 122 of folding device 100 of FIGS. 1A and 1B. Similarly, support plates 240 may be an example of support plates 140 of FIG. 1C.

FIG. 2A is a direct perspective of a hinge assembly 222 of a folding device (e.g., folding device 100 of FIG. 1A-1C), in accordance with one or more aspects of this disclosure. FIG. 2B is an angled perspective of a hinge assembly 222 of a folding device (e.g., folding device 100 of FIG. 1A-1C), in accordance with one or more aspects of this disclosure. As shown in FIGS. 2A and 2B, hinge assemblies 222 may include support plates 240 comprising a single continuous plate folded to create two parallel plates, a first parallel plate 224A and 224B (collectively, "a first plate 224") and a second parallel plate 228A and 228B (collectively, "a second plate 228"), assembly geometry 230, and interflex connections 225. Where the first plate 224 is closer to a rear of the continuous plate than the second plate 228.

In some examples, interflex connections 225 may be one or more electrical connections (e.g., power and/or data) spanning the boundary between the two housings of the folding device. For instance, interflex connections 225 may include one or more ribbon cables routed between the two housings (e.g., housings 102 and 104 of FIG. 1C) across the hinge assembly 222. Interflex connections 225 may be located below the second parallel plate 228, proximal to the hinge assembly. In areas/regions of supporting plates 240 where the interflex connections 225 are located, weight reduction features are not present, and in some examples assembly geometry 230 is not present either. This is further shown in FIGS. 4A and 4B.

Assembly geometry 230, as shown in FIGS. 2A and 2B may be a circular void designed as a hole for a screw. As one example, a void may be an absence of a portion of both the first plate 224 and second plate 228. In another example, a void may be an absence of a portion of either the first plate 224 or the second plate 228. In some examples, the screw in assembly geometry 230 may be used to join the first plate 224 and the second plate 228 together. As another example, the screw in assembly geometry 230 may be used to join support plates 240 to other components such as a scoop. In some examples the screw in assembly geometry 230 may be coplanar (i.e., flush, level, even, smooth, etc.) with the first plate 224. As one example, a filler, padding or other object may be inserted in assembly geometry 230 instead of the screw, or in addition to the screw, and may be coplanar with the first plate 224. In some examples, assembly geometry 230 is located between the fold in support plate 240 and the straight edge of the first plate 224. Further, assembly geometry 230 may be located equidistant to the fold in the support plate 240 and the straight edge of the first plate 224, closer to the fold in support plate 240, or closer to the straight edge of the first plate 224.

Figures 3A, 3B, 3C:
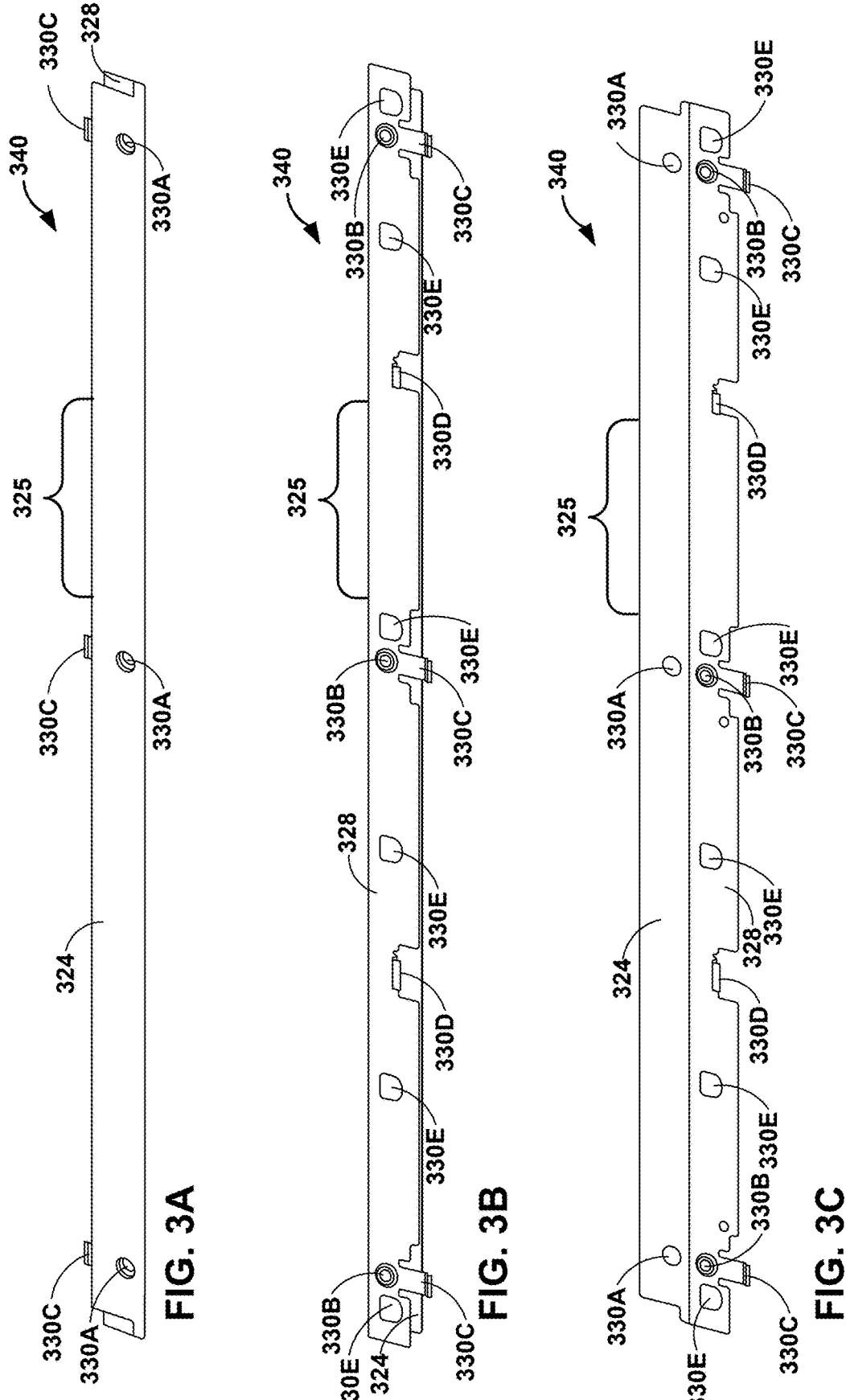
FIGS. 3A, 3B, and 3C are conceptual diagrams illustrating example supporting plates, in accordance with one or more aspects of this disclosure.

FIGS. 3A, 3B, and 3C are conceptual diagrams illustrating example supporting plates 340, in accordance with one or more aspects of this disclosure. Support plate 340 may be an example of supporting plates 240A, 240B, 140A, or 140B of FIGS. 1C, 2A, and 2B. Similarly, a first plate 324, a second plate 328, assembly geometry 330A, 330B, 330C, 330D, and 330E, and interflex connections 325 may be examples of a first plate 224, a second plate 228, assembly geometry 230, and interflex connections 225 of FIGS. 2A and 2B. FIGS. 3A, 3B, and 3C illustrate support plate 340 isolated from the hinge assembly of FIGS. 2A and 2B. FIG. 3A shows the support plate 340 with the first plate 324 in primary view, FIG. 3B shows the support plate 340 with the second plate 328 in primary view, and FIG. 3C shows support plate 340 unfolded with both the first plate 324 and the second plate 328 in primary view.

In some examples, assembly geometry 330 may comprise one or more of 330A, 330B, 330C, 330D and/or 330E (collectively, "assembly geometry 330"). Assembly geometry 330 may comprise one or more voids. As noted above, a void may be an absence of a portion of the first plate 324 and the second plate 328 and may, in the instance of 330A and 330B, be a circular void designed as a hole for a screw. In one example, FIG. 3C shows assembly geometry 330A on the first plate 324 and corresponding assembly geometry 330B on the second plate 328. In another example, assembly geometry 330B, 330C, 330D, and 330E are only present on the second plate 328 and are not configured to contain corresponding assembly geometry on the first plate 324.

In some examples, assembly geometry 330 may consist of one or more modifications that include an addition to a portion of the second plate 328. Further, in some examples, assembly geometry 330 may consist of modifications that include the addition to and absence of a portion of the second plate 328. For example, assembly geometry 330C and 330D consist of modifications to the second plate 328 that include the creation of additions and voids.

In general, assembly geometry is primarily present on the second plate 328. In some examples, where assembly geometry is present on the first plate 324, it is less complex and still allows for a clean (i.e., smooth, flat, unblemished) first plate 324.

Figures 4A, 4B:
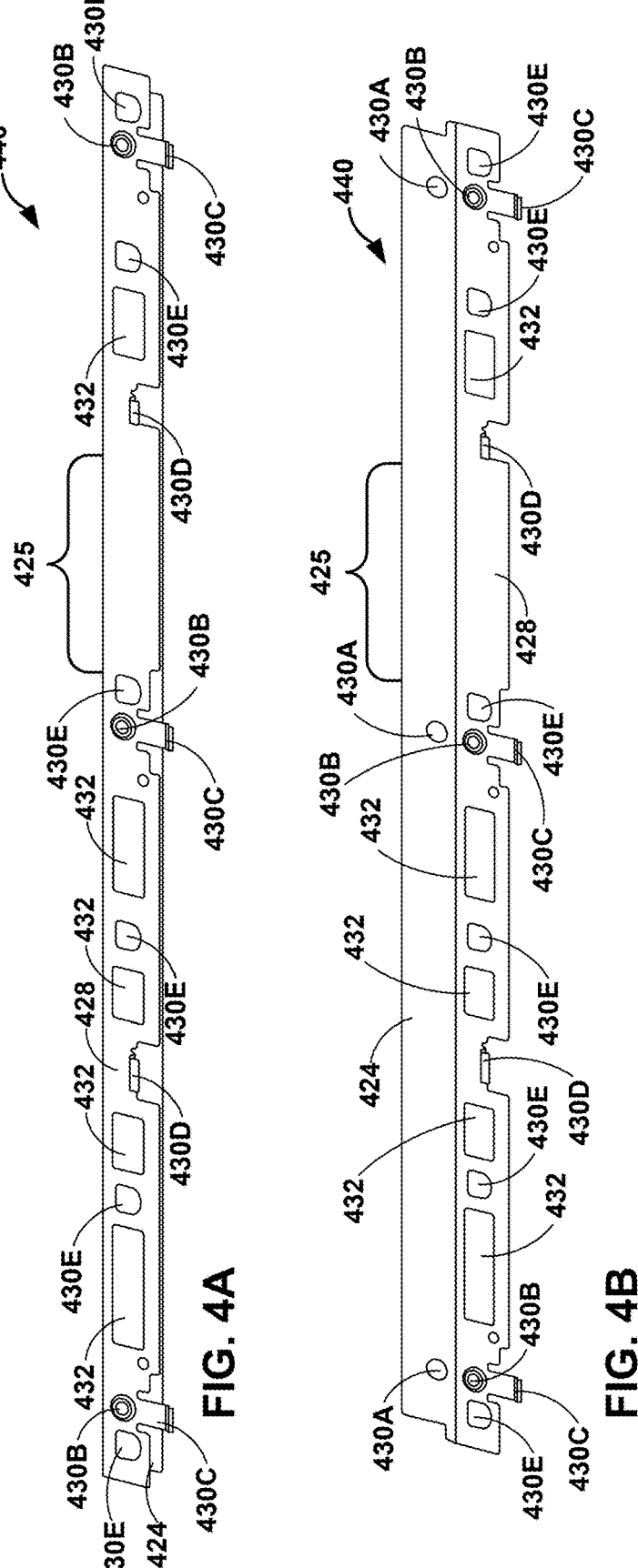
FIGS. 4A and 4B are conceptual diagrams further illustrating example supporting plates, in accordance with one or more aspects of this disclosure.

FIGS. 4A and 4B are conceptual diagrams further illustrating example supporting plate 440, in accordance with one or more aspects of this disclosure. Support plate 440 may be an example of support plate 340 of FIGS. 3A-3C. Similarly, a first plate 424, a second plate 428, assembly geometry 430A, 430B, 430C, 430D, and 430E, and interflex connections 425 may be examples of a first plate 324, a second plate 328, assembly geometry 330A, 330B, 330C, 330D, and 330E, and interflex connections 325 of FIGS. 3A-3C. FIGS. 4A and 4B illustrate support plate 440 configured with weight reduction geometry 432 and isolated from the hinge assemblies of FIGS. 2A and 2B. FIG. 4A shows the support plate 440 with the second plate 428 in primary view, and FIG. 4B shows support plate 440 unfolded with both the first plate 424 and the second plate 428 in primary view.

In some examples, weight reduction geometry 432 may comprise of one or more voids configured to reduce the weight of support plate 440. In one example, weight reduction features 432 are only present on the second plate 428, as illustrated by FIG. 4B. In another example, weight reduction features 432 may not be present in areas comprising the interflex connections 425.

Figure 5:
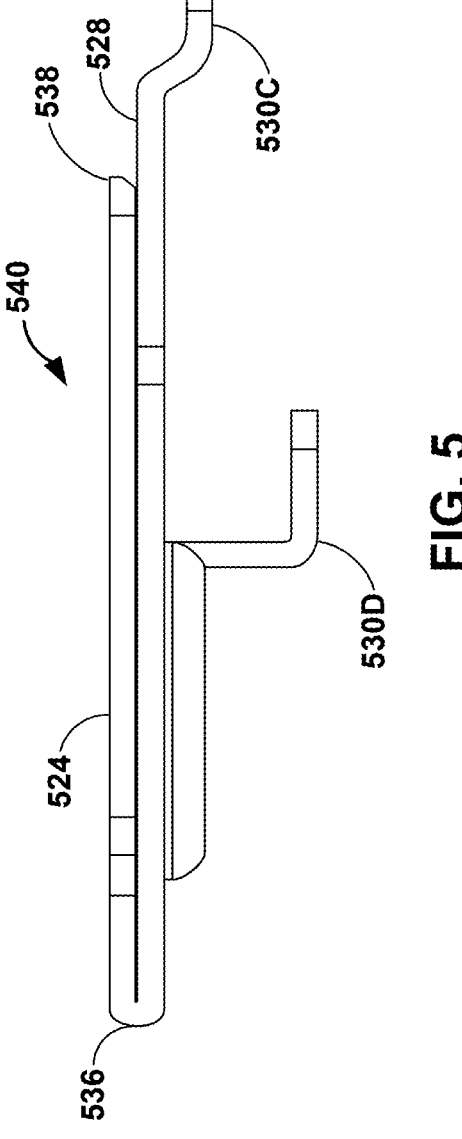
FIG. 5 is a conceptual diagram illustrating a cross-sectional view of example supporting plate, in accordance with one or more aspects of this disclosure.

FIG. 5 is a conceptual diagram illustrating a cross-sectional view of example supporting plate 540, in accordance with one or more aspects of this disclosure. FIG. 5 may be a cross-sectional view of folding device 100 of FIG. 1A along line A-A. Support plate 540 may be an example of support plate 440 of FIGS. 4A and 4B. Similarly, a first plate 524, a second plate 528, and assembly geometry 530C and 530D may be examples of a first plate 424, a second plate 428, and assembly geometry 430C and 430D of FIGS. 4A and 4B.

In some examples, support plate 540 may comprise a continuous plate folded over itself to create a fold 536 and a first plate 524, parallel to, a second plate 528. Where the fold 536 in the single continuous plate is opposite the straight edge 538 of the first plate 524. In one example, the single continuous plate may be made from stainless steel and the first and second plates may be joined via spot welding. Such joining may provide added robustness/stiffness to the support plate 540 without weight penalty.

The following numbered examples may illustrate one or more aspects of this disclosure:

Example 1. A folding device comprising: a first housing; a second housing; a hinge assembly rotatably connected to the first housing and the second housing; a continuous display connected to and across the first housing and the second housing; and a first collapsible support plate connected to the first housing and configured to support the continuous display when the folding device is fully opened, wherein: the first collapsible support plate comprises a single continuous plate folded over itself to form two parallel plates, a first parallel plate of the two parallel plates defines a straight edge that overhangs one or more voids in a second parallel plate of the two parallel plates, and the straight edge defined by the first parallel plate is adjacent to the hinge assembly.

Example 2. The folding device of example 1, wherein the first parallel plate of the two parallel plates comprises fewer voids than the second parallel plate of the two parallel plates and, wherein the voids in the second parallel plate are proximal to the hinge assembly.

Example 3. The folding device of example 1, wherein the voids in the two parallel plates comprise at least one or more of: assembly geometry; and weight reduction features.

Example 4. The folding device of example 3, wherein one or more interflex connections are routed between the first housing and the second housing, and wherein the weight reduction features are not present at regions of the single continuous plate where the interflex is routed.

Example 5. The folding device of example 3, wherein the assembly geometry further comprises a circular void configured to comprise a screw and/or a filler, wherein: a portion of the screw or the filler distal to the hinge assembly is flush with the first parallel plate of the two parallel plates, and the circular void is not intersected by the straight edge of the first parallel plate or the fold in the single continuous plate.

Example 6. The folding device of example 1, wherein a fold in the single continuous plate is opposite the straight edge of the first parallel plate.

Example 7. The folding device of example 1, wherein the first parallel plate and the second parallel plate of the two parallel plates are spot welded together.

Example 8. The folding device of example 1, wherein the single continuous plate is formed of stainless steel.

Example 9. The folding device of example 1, further comprising: a second collapsible support plate connected to the second housing and configured to support the continuous display when the folding device is fully opened, wherein, the second collapsible support plate comprises a single continuous plate folded over itself to form two parallel plates.

The invention claimed is:

1. A folding device comprising:
a first housing;
a second housing;
a hinge assembly rotatably connected to the first housing and the second housing;
a continuous display connected to and across the first housing and the second housing; and
a first collapsible support plate connected to the first housing and configured to support the continuous display when the folding device is fully opened, wherein:
the first collapsible support plate comprises a single continuous plate of sheet material folded over itself to form two parallel plates, a first parallel plate of the two parallel plates comprises one or more voids and defines a straight edge that overhangs one or more voids in a second parallel plate of the two parallel plates, and
the straight edge defined by the first parallel plate is adjacent to the hinge assembly.

2. The folding device of claim 1, wherein the first parallel plate of the two parallel plates comprises fewer voids than the second parallel plate of the two parallel plates and, wherein the voids in the second parallel plate are proximal to the hinge assembly.

3. The folding device of claim 1, wherein the voids in the two parallel plates comprise at least one or more of:
assembly geometry; and
weight reduction features.

4. The folding device of claim 1, wherein the voids in the two parallel plates comprise weight reduction features, and wherein one or more interflex connections are routed between the first housing and the second housing, and wherein the weight reduction features are not present at regions of the single continuous plate where the interflex is routed.

5. The folding device of claim 1, wherein the voids in the two parallel plates comprise assembly geometry, and wherein the assembly geometry further comprises a circular void configured to comprise a screw and/or a filler, wherein:
a portion of the screw or the filler distal to the hinge assembly is flush with the first parallel plate of the two parallel plates, and
the circular void is not intersected by the straight edge of the first parallel plate or the fold in the single continuous plate.

6. The folding device of claim 1, wherein a fold in the single continuous plate is opposite the straight edge of the first parallel plate.

7. The folding device of claim 1, wherein the first parallel plate and the second parallel plate of the two parallel plates are spot welded together.

8. The folding device of claim 1, wherein the single continuous plate of sheet material is formed of stainless steel.

9. The folding device of claim 1, further comprising:
a second collapsible support plate connected to the second housing and configured to support the continuous display when the folding device is fully opened, wherein,
the second collapsible support plate comprises a single continuous plate folded over itself to form two parallel plates.

* * * * *